S. LARSON.
OUTBOARD BEARING FOR AUTOMOBILE TRUCK JACK SHAFTS.
APPLICATION FILED FEB. 5, 1918.
1,281,176. Patented Oct. 8, 1918.
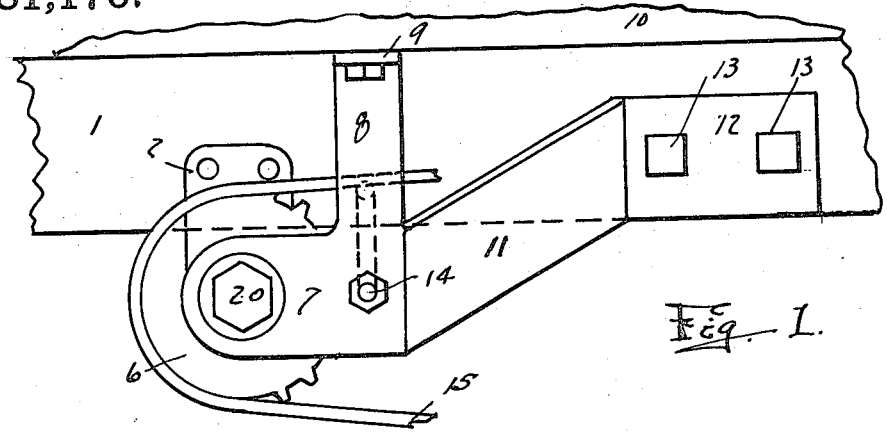
Fig. 1.
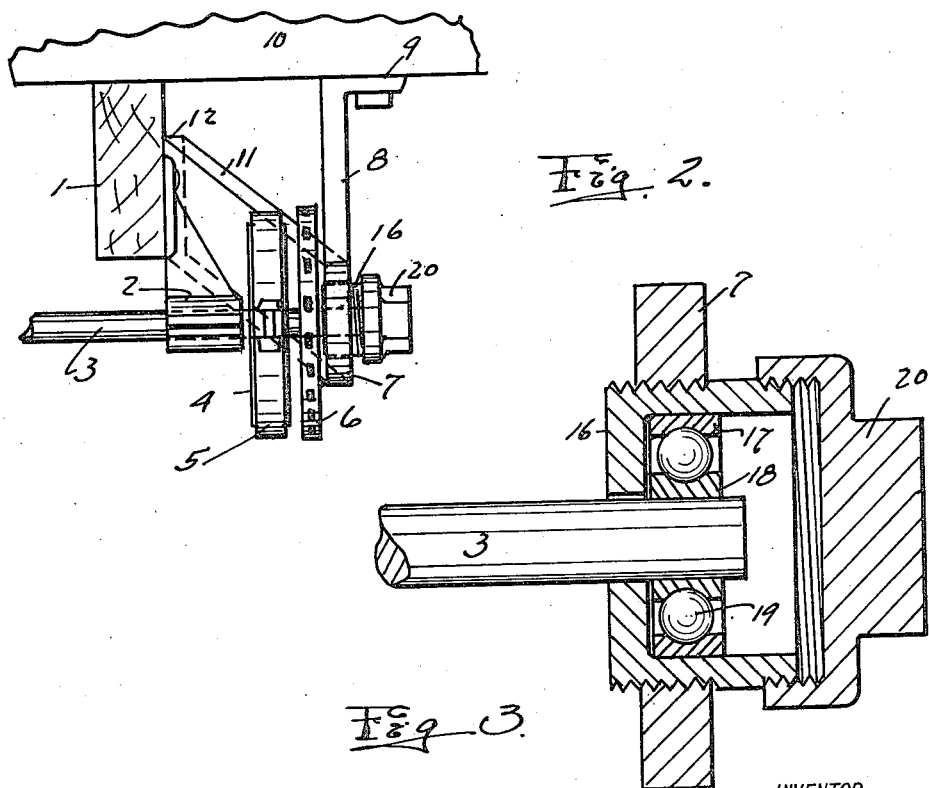
Fig. 2.
Fig. 3.
INVENTOR
Sverin Larson
BY
Fred P. Gorin
ATTORNEY

UNITED STATES PATENT OFFICE.

SEVERIN LARSON, OF SEATTLE, WASHINGTON.

OUTBOARD-BEARING FOR AUTOMOBILE-TRUCK JACK-SHAFTS.

1,281,176.   Specification of Letters Patent.   Patented Oct. 8, 1918.

Application filed February 5, 1918. Serial No. 215,426.

*To all whom it may concern:*

Be it known that I, SEVERIN LARSON, citizen of the United States, residing at Seattle, in the county of King and State of Washington, have invented certain new and useful Improvements in Outboard-Bearings for Automobile-Truck Jack-Shafts, of which the following is a specification.

This invention relates to improvements in out board bearings for automobile truck jack shafts and has for its principal object to provide an improved and novel design of out board bearing for use with light automobile trucks in which it is necessary to provide an outside bearing to support the outer ends of the jack shaft. In certain well-known methods of re-building Ford chassis into light trucks it is common practice to extend the side frames of the chassis, set the rear wheels back under the extension portion and drive the rear axle with chains from the original rear axle on the chassis. In this construction the original rear axle of the chassis is called a jack shaft and the sprockets re-place the rear wheels as formerly employed. Considerable difficulty has been experienced in this type of construction with the excessive straining and bending of the outer end of the jack shaft. Applicant has therefore devised a novel construction for an out board bearing which obviates the above difficulty.

Other objects will appear as my invention is more fully explained in the following specification, illustrated in the accompanying drawings and pointed out in the appended claims.

In the drawings Figure 1 is a side elevation of applicant's device shown attached to a fragment of a truck. Fig. 2 is an end elevation of same. Fig. 3 is an enlarged detailed sectional elevation of applicant's bearings.

Referring more particularly to the drawings numeral 1 indicates the side frame of the chassis to which is secured a downwardly extending bearing 2 within which a jack shaft 3 is mounted. The end of the jack shaft extends out beyond the bearing 2 and upon this extended portion of the shaft is mounted a brake drum 4 upon which a brake band 5 operates. Beyond the brake drum a chain sprocket 6 is secured to the shaft and still farther beyond the chain sprocket applicant mounts his out board bearing. Applicant's out board bearing consists of a rigid and horizontal member 7, a vertical and upstanding member 8 which is integral with the member 7 and which is provided with an annular extension 9 at its upper end. The extension 9 is secured to the bottom of the body 10 of the truck. Just forward of the upright member 8 a horizontal and vertically inclined member 11 extends inwardly toward the side frame 1 and terminates at its inner end in a horizontal member 12 which is parallel to the member 7 and which lies against the outer side of the side frame 1 and is secured thereto by means of bolts 13. A stiffening rod 14 passes through the member 7 directly beneath the member 8 and extends upwardly and inwardly until it intersects the side frame 1 to which it is secured. The stiffening rod 14 serves to steady the bearing laterally. It will thus be seen that applicant has provided an out board bearing which has three distinct points of support and which is peculiarly well adapted to the conditions at hand as the bearing must not interfere with the free operation of a sprocket chain 15. The member 7 is provided with a threaded transverse opening which is in line with shaft 3 and through which the end of shaft 3 projects slightly. The hole in member 7 is considerably larger than the shaft and is adapted to adjustably receive an externally threaded housing 16 which fits loosely over the end of the shaft and which is open at its outer end. An outer ring 17 of a ball bearing is force-fitted into the housing 16 and the inner ring 18 of said bearing is similarly fitted to the end of shaft 3. Ball bearings 19 run intermediate the rings 17 and 18 thus providing an antifriction bearing for the extended end of the shaft 3. The outer end of housing 16 is threaded externally and is provided with a hub cap 20 which screws on to the threaded portion of the housing. The cap 20 serves two purposes, namely, that of preventing the dust and dirt from getting into the ball bearing and that of forcing grease into the ball bearing as the housing is normally filled with grease and the setting up of the cap will force this grease into the ball bearing recess.

While I have shown a particular form of embodiment of my invention, I am aware that many minor changes therein will readily suggest themselves to others skilled in the art without departing from the spirit and scope of the invention, and I therefore desire to avoid being limited to the exact form shown and described. Having described my invention, what I claim as new and desire to protect by Letters Patent, is:—

Claims.

1. In a device of the class described the combination with a truck side frame of a jack shaft positioned transversely the said side frames, an out board bearing means for supporting the free end of the said shaft at a point beyond the said side frames; said out board bearing means including a horizontal member which is provided with a threaded opening through which the said shaft projects, a vertical extension member integral with the said horizontal member, a vertically inclined member integral with the said horizontal member and secured at its inner end to the said side frame, a threaded housing positioned within the opening in the said horizontal member and inclosing the end of the said shaft, and a ball bearing within the said housing and coöperating with the said shaft, whereby the outer end of the shaft is revolubly and rigidly supported.

2. In a device of the class described the combination of a truck side frame, a jack shaft arranged at right angles to and positioned beneath the said side frame, a truck body resting upon the said frame member and extending horizontally beyond the said frame member, an out board bearing adapted to support the outer end of the said shaft; said out board bearing including a horizontal member parallel with the said side frame and having an internally threaded opening positioned concentrically with the end of the said shaft, an upwardly extending member integral with the said horizontal member and secured at its upper end to the said truck body, an upwardly and inwardly inclined member integral with the said horizontal member, another horizontal member parallel with the first mentioned horizontal member and integral with the free end of the said inclined member and secured to the outer side of side frame, a stiffening rod secured at its outer end to the first mentioned horizontal member and at its inner end to the side frame, whereby the bearing is stiffened laterally, an externally threaded housing screwed within the opening in the first mentioned horizontal member and inclosing the end of the said shaft, a ball bearing intermediate the shaft and the inside of the housing, whereby the outer end of the shaft is provided with a rigid and anti-friction bearing, a hub cap on the open end of the said housing, whereby the housing may be closed.

In testimony whereof I affix my signature.

SEVERIN LARSON.